Oct. 7, 1930.  W. B. FAGEOL  1,777,966
DELIVERY TRUCK
Original Filed Aug. 16, 1927  2 Sheets-Sheet 1

Inventor
William B. Fageol
By William A. Strauch
Attorney

Oct. 7, 1930.  W. B. FAGEOL  1,777,966
DELIVERY TRUCK
Original Filed Aug. 16, 1927  2 Sheets-Sheet 2
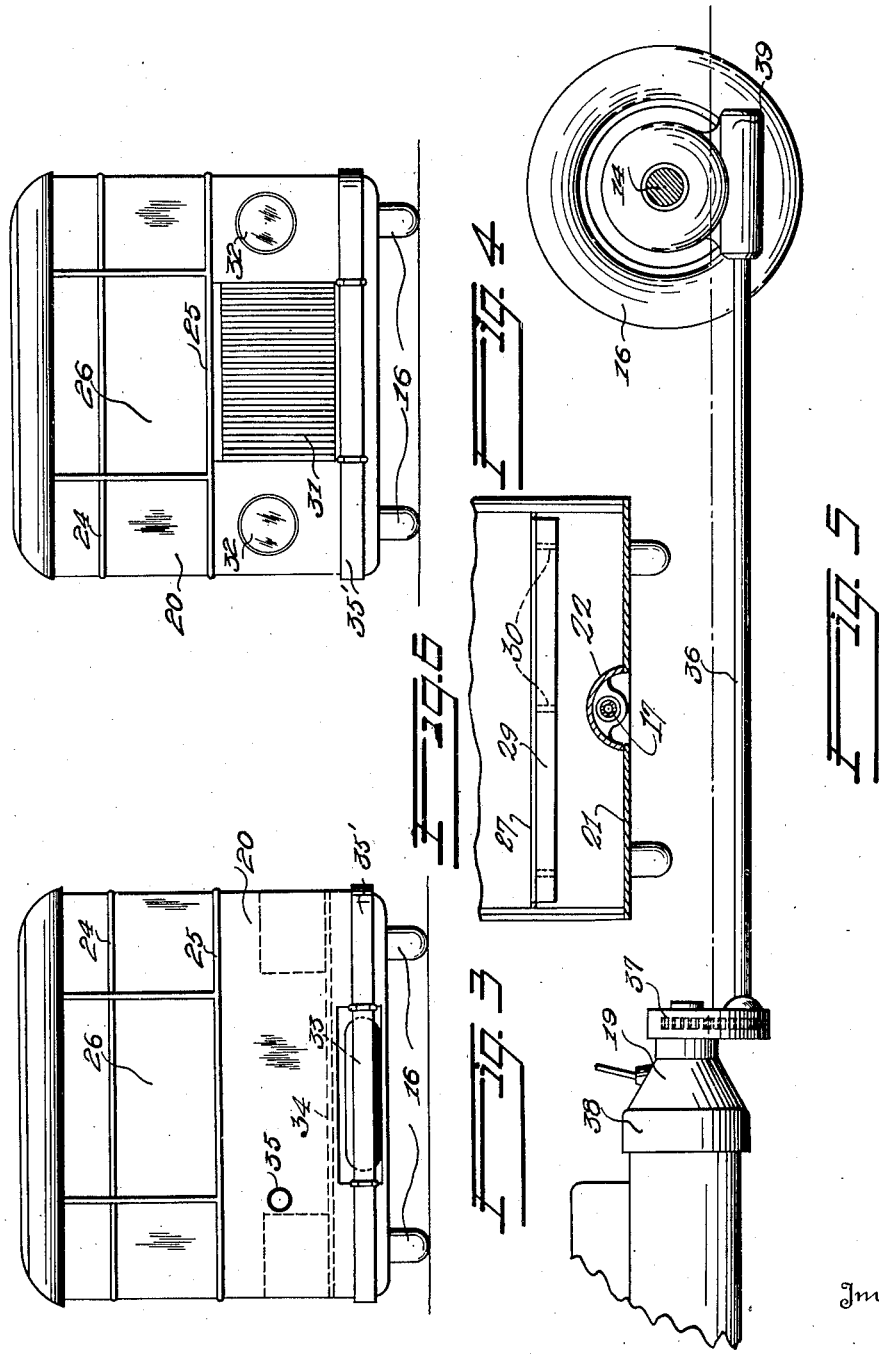

Patented Oct. 7, 1930

1,777,966

UNITED STATES PATENT OFFICE

WILLIAM B. FAGEOL, OF KENT, OHIO

DELIVERY TRUCK

Application filed August 16, 1927, Serial No. 213,389. Renewed February 21, 1930.

This invention relates to a motor driven delivery truck designed to facilitate the carrying and delivery of mail or light merchandise of every description. It is the general practice to utilize trucks for delivery that, aside from the fact that they have a comparatively large carrying capacity located to the rear of the position generally occupied by the driver, are not especially designed to serve the purpose for which they are intended, and no provision is made to enable the operator of the vehicle to expeditiously enter and leave the vehicle in performing his duties. Furthermore, it is not the practice to utilize all of the space available for a predetermined wheel base and width of chassis, and no provision is made for the carrying of parcels or letters in position in front of the driver of the vehicle so that he can read the addresses usually found thereon while he is proceeding from one address to the next and without requiring him to substantially divert his attention from the road over which he is passing.

The primary object of the invention is to provide a delivery truck that is especially designed to facilitate and expedite the delivery of comparatively small articles such as parcels or letters.

A further object of the invention is to provide a delivery truck that can be entered and left with a minimum expenditure of physical energy on the part of the driver and without unnecessary loss of time.

A further object of the invention is to provide a truck designed to provide ample space in front of the driver for the reception of parcels in the order in which they are to be delivered.

A further object of the invention is to provide a truck having a maximum of body space for a given wheel base and width, and in which the body is of substantially the same width from end to end and of substantially the same length from side to side, and making the space above the engine and wheels normally used for a hood and fenders respectively available for storage space.

A further object of the invention is to provide a delivery truck having a seat that is adjustable to selectively present a seat for the driver or a rest to support his weight in half standing position, when he is making a short run between stops that are not widely separated.

A still further object of the invention is to provide a delivery truck having a floor line that is as low as, or lower than the plane that contains the axes of rotation of the wheels and in which the propeller shaft is so disposed as not to substantially interfere with the egress or ingress of the operator of the vehicle.

Still further objects of the invention will appear as a description thereof proceeds with reference to the accompanying drawings in which, Figure 1 is a side elevation of the improved delivery truck.

Figure 3 is a rear elevation.

Figure 4 is a front elevation.

Figure 5 is a fragmentary view on an enlarged scale of a modified form of drive mechanism.

Fig. 6 is a sectional view taken on the line 6—6 on Fig. 1.

Like reference characters indicate like parts throughout the several views.

Figure 2:
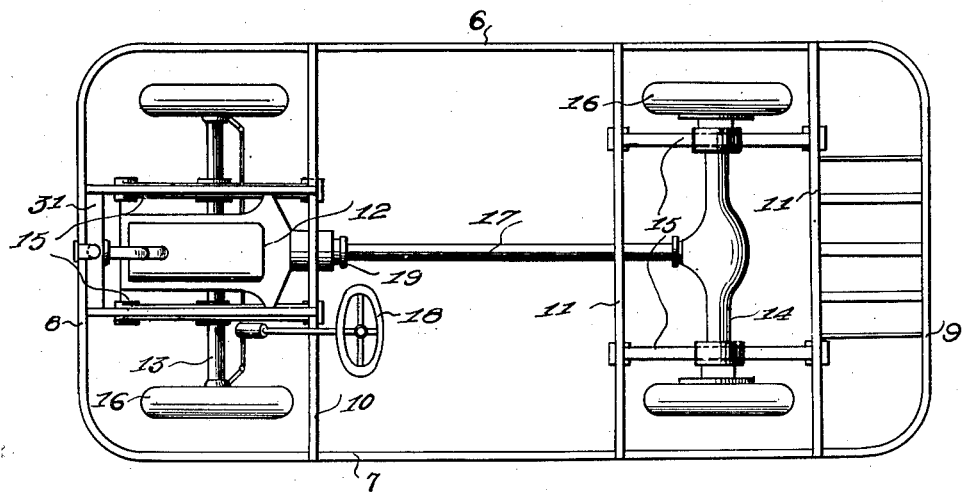
Figure 2 is a plan view of the chassis of the vehicle.

The frame of the improved vehicle consists of a substantially rectangular frame, comprising side members 6 and 7, end members 8 and 9 and intermediate transverse members 10 and 11 A motor 12 of conventional form is mounted on said frame which also in the form shown serves as body members The frame and body are supported from axles 13 and 14, by means of springs 15 secured at their ends to the frame members and at their mid-portions to the axles in any well known and suitable manner. The axles are supported on wheels 16 in the usual manner. A drive or propeller shaft 17 extends from motor 12 to the rear axle 14 to drive the well known differential mechanism housed therein. The forward wheels are dirigible, and are controlled by the steering wheel 18 through any suitable steering interconnection. Conventional lever controlled transmission mechanism 19 interposed between the engine and propeller shaft 17 may be used. Aside from the arrangement of the frame and body members all of the mechanism so far described is well known in the art, and may be of any standard type. The frame and body, however, as shown in Figure 2, is made of a width that is materially greater than the length of the axles and is materially longer than the wheel base so that in length and width the frame and body substantially overhangs or extends beyond the wheels.

Mounted or built on said frame in any suitable manner is a box-like body 20 of substantially rectangular cross-section on longitudinal, as well as transverse, planes. The floor 21 of the body is lowered to a point as low as or even substantially below the horizontal plane that contains the axes of the axles, a central longitudinal tunnel-like member 22 projecting into the body being provided to house the shaft 17. In view of the width of the body such member does not materially interfere with the ingress or egress of the operator through either of two side or door openings 23 provided in opposite sides of the body.

Glass or window panels may be provided in the body sides between longitudinal members 24 and 25 as may be desired, and in the ends of the body in the panels 26.

Figure 1:
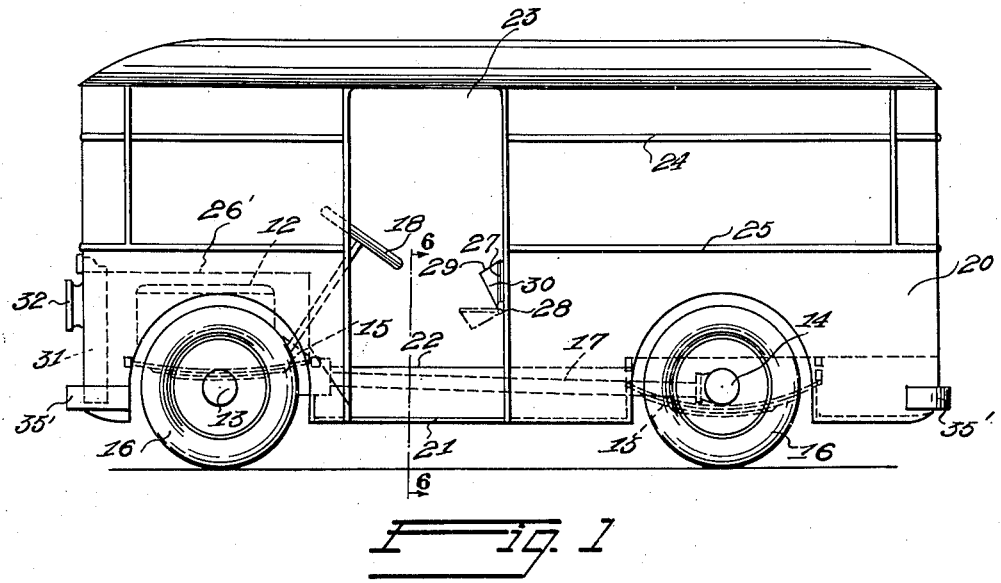

As clearly shown in Figure 1, the body extends forwardly, and houses the motor and all of the wheels, as indicated at 26', leaving a substantial space above said motor and wheels within the body for utilization in carrying parcels. The motor and wheel housings extending into the body of the vehicle above its floor line provides a shelf as indicated at 26' for the reception and storage of the articles. Articles may be arranged on the shelf or table over the motor in the order of their delivery, as may be desired, while the wheel housings which extend into the body permit the space over them to be used for storage.

A main seat 27 is provided within the body. Said seat is hinged to the body framework as shown at 28 and is provided with a secondary seat 29 arranged at an acute angle beneath the main seat from which it is supported by suitable brackets 30. When the seat occupies the position shown in dotted lines in Figure 1, the operator of the vehicle occupies the seat 27 assuming a sitting posture. Said seat is occupied on extended drives to places at which articles are to be delivered. When numerous deliveries are to be made in the same locality, the seat is swung toward its full line position shown in Figure 1, and the operator assumes a half standing position resting on the seat 29. He is thus in position to drive the vehicle for short distances, and in position to leave the vehicle without the slightest delay when the point of delivery is reached. The lowering of the level of floor 21 permits the driver to assume a half standing position without requiring that the height of the body be made so great that the vehicle is top heavy. At the same time, the low floor, about nine inches above the ground and without a special step or running board enables the driver to step on and off the vehicle with facility and safety and without unnecessary loss of time.

The space in the body to the rear of the driver may be utilized to accommodate large bundles, and it may be subdivided in any manner to facilitate the handling of the commodity to be delivered or collected as the case may be. A radiator 31 of conventional form may be located flush with the front of the body in a suitable compartment in the front of the body, and headlights 32 are arranged on each side of the radiator. A spare tire compartment 33 may be provided in the rear of the frame of the vehicle below the floor line 34, so that the rear of the vehicle is arranged above the rear axle and on a level with the top of the member 22. A tail light 35 is preferably set in the rear end of the vehicle, and bumpers 35' are provided at the ends of the body. The rear bumper section is provided with a hinged section to permit access to tire compartment 33.

In lieu of the drive shaft 17, and to avoid the use of the member 22 projecting above the level of the floor, the drive shown in Figure 5 may be used. In this view, the drive shaft 36 is journaled in a housing 37, secured to the transmission housing 38, and a housing 39 carried by the rear axle. A worm drive is located in housing 39, the worm engaging the worm wheel below the axle center rather than above as is customary. Shaft 36 is driven from the engine tail shaft by sprocket wheels and chain located in housing 37. Obviously suitable gears may be used in place of the sprocket and chain in this housing.

In operation, the operator of the vehicle in driving to the locality in which deliveries are to be made, adjusts the seat within the body to the dotted line position in Figure 1. He is then in comfortable position to drive the vehicle a comparatively long distance. After reaching his destination, the seat is swung to the full line position in Figure 1, and the operator assumes a half standing position in driving from place to place in the same locality. He is thus in position to leave the vehicle, in view of the low floor line without delay and can as conveniently re-enter the body of the vehicle to proceed to the next point. This point can be kept constantly in view by arranging the articles to be delivered in the space within the body over the motor so that he can see the addresses as he proceeds to the next stop without substantially diverting his gaze from the road. If desired, a brake lever may be provided that in the operation thereof throws out the usual clutch at the same time that the brake is applied. This will further speed up the delivery service.

The invention may be embodied in other specific forms without departing from the spirit or essential characteristics thereof, and the present embodiment is therefore to be considered illustrative rather than restrictive, the scope of the invention being indicated by the appended claims and all changes that come within the meaning and range of equivalency of the claims are intended to be embraced therein.

What I claim as new is:

1. A motor driven delivery vehicle comprising a body having a door opening for use of the operator of the vehicle in making deliveries, a floor line inside of said opening that is located as low as the plane that contains the axes of the axles, and a seat within the body having a forwardly and downwardly inclined surface to support the operator in a half standing position.

2. The combination defined in claim 1 in which the seat is a hinged structure having two seat surfaces one of which supports the operator in seated position and the other of which supports him in half standing position, said surfaces being arranged to be brought into position by swinging said structure about its hinged connection.

3. A motor driven delivery vehicle comprising axles, a closed body extending over a motor disposed over the forward axle and providing a substantial space within said body above the motor, a door opening in said body, a floor inside said opening extending across said body on a line as low as the plane that contains the axes of the axles and a shaft connecting said motor to the rear axle, said shaft being arranged above said floor line and being covered by a housing of relatively narrow width transversely of said vehicle.

4. The combination defined in claim 3 including a seat provided with a forwardly and downwardly inclined surface arranged in said body to support the operator in half standing position.

5. A motor driven delivery vehicle comprising a forwardly disposed motor, axles, wheels supporting said axles, a drive shaft extending endwise of the body, a body supported by the axles, said body extending over and laterally beyond said wheels and over said motor and being substantially rectangular in horizontal section, a floor extending across said body adjacent and to the rear of said motor, the line of said floor being located as low as the plane that contains the axes of the wheels and a door in said body at said low floor.

6. The combination defined in claim 5 including a seat having a downwardly and forwardly inclined surface disposed within the body to support the operator in a half standing position over the portion of the floor adjacent the motor.

7. A motor driven delivery vehicle comprising a box like body, a chassis including a frame, a forwardly disposed motor, axles, wheels, springs, and a drive shaft extending from said motor to one of said axles, said chassis including the wheels thereof being completely housed by said box-like body, a door opening in the side of said body and a floor within the body opposite said door and adjacent to and to the rear of said motor end having a floor line at both sides of said body that is as low as a plane containing the axes of the axles.

8. A low bed delivery vehicle comprising a body, including a base frame of relatively light structural elements, sides, ends and a roof, axles carrying wheels disposed beneath and substantially housed by said body, springs interconnecting said axles to certain of the elements of said base frame, self-contained power means supported by said base frame over the forwardly disposed axle and housed by said body, and a floor extending across said body adjacent said power means and between said wheels, said floor being disposed so that its is substantially as low as the plane containing the axes of rotation of said wheels.

9. A low bed delivery vehicle comprising a body, including a base frame of relatively light structural elements, sides, ends and a roof, said frame being free of elements extending from end to end longitudinally of the body between the sides thereof, axles carrying wheels disposed beneath and substantially housed by said body, springs interconnecting said axles to certain transverse elements of said frame, self contained power means supported by said body and housed thereby, and a floor extending across the body between the wheels and adjacent said power means, said floor being disposed so that it is substantially as low as the plane containing the axes of rotation of said wheels.

10. A low bed delivery vehicle comprising a body, including a frame of relatively light structural elements, axles carrying wheels disposed beneath said body, springs interconnecting said axles to certain of the elements of said frame, a self contained power unit supported by said frame adjacent the forward end thereof and housed by said body, and a floor within said body between said wheels and adjacent to said power unit, said floor being disposed so that it is substantially as low as the plane containing the axes of rotation of said wheels.

11. A low bed delivery vehicle comprising a box-like body, including a frame of relatively light structural elements, a pair of structural elements extending transversely of the base of said body adjacent each end thereof, spring secured at their ends to said transversely extending elements, axles carrying wheels attached to said springs, an internal combustion engine disposed between the ends of and housed within said body and supported on the forward pair of transversely extending elements, and means to cause said internal combustion engine to propel the vehicle, said means being supported by said body frame.

12. An automotive delivery vehicle comprising a body of substantially the same height from end to end, the base frame of said body consisting of relatively light transverse and longitudinal members, axles each supported by a pair of wheels housed by said body, springs directly connecting said axles to certain of said relatively light frame members, and an internal combustion engine housed by said body between the ends and supported on the base frame of said body adjacent the forward end thereof, said vehicle being free of longitudinal members extending from end to end of the body, a floor in said body adjacent to the rear of said engine and lower than the drive shaft thereof, and a door in said body opposite said floor.

13. An automotive delivery vehicle comprising a body consisting of a base frame, sides, ends and a roof; axles; wheels supporting said axles; springs interconnecting said axles and body base frame; said wheels and axles being completely housed beneath said body, an internal combustion engine supported on said base frame and housed by said body; a floor on said frame extending completely across said body, to the rear of said engine the floor line of which is as low as the axes of rotation of said wheels; and a door in said body opposite said floor.

14. An automotive delivery vehicle comprising a body consisting of a base frame, sides, ends and a roof; axles; wheels supporting said axles; springs interconnecting said axles and body base frame; said wheels and axles being completely housed beneath said body, an internal combustion engine supported on said base frame and housed by said body; a drive shaft extending from said engine to the rearwardly disposed axle; a floor on said frame to the rear of said engine and lower than said drive shaft and the axes of rotation of said wheels; means to house said shaft projecting above the floor; and doors in said body opposite said floor.

15. An automotive delivery vehicle comprising a pair of axles, each supported by a pair of wheels, a body having a base frame, sides, ends and a roof, supported on said axles and completely housing said wheels, an internal combustion engine supported and housed by said body between said ends and arranged over the forward axle, a drive shaft extending from said motor to the rear axle, a floor extending entirely across said body adjacent the rear of said engine and between said axles, said floor being arranged lower than said drive shaft and as low as the axes of rotation of said wheels and doors in said body at said low floor.

16. An automotive delivery vehicle comprising a pair of axles, each supported by a pair of wheels, a body, springs interconnecting said body and axles, an internal combustion engine supported over the forward axle, a drive shaft extending from said internal combustion engine to the rear axle, a floor in said body adjacent the rear of said engine and between said axles, said floor extending across said body and being arranged lower than said drive shaft and as low as the axes of rotation of said wheels, and doors in both sides of said body each opening at said low floor.

In testimony whereof I affix my signature.

WILLIAM B. FAGEOL.

CERTIFICATE OF CORRECTION.

Patent No. 1,777,966.                                              October 7, 1930.

WILLIAM B. FAGEOL.

It is hereby certified that error appears in the printed specification of the above numbered patent requiring correction as follows: Page 3, line 79, claim 7, after "to" first occurrence, insert a comma and for the word "end" read and; line 122, claim 10, for "within" read extending across; page 4, line 2, claim 11, for "spring" read springs; and that the said Letters Patent should be read with these corrections therein that the same may conform to the record of the case in the Patent Office.

Signed and sealed this 12th day of July, A. D. 1938.

(Seal)

Henry Van Arsdale,
Acting Commissioner of Patents.